April 14, 1970     H. D. JACKSON     3,505,746
EDUCATIONAL TESTING SYSTEM
Filed Nov. 13, 1967     4 Sheets-Sheet 1

INVENTOR.
HAL D. JACKSON
BY Head & Johnson
ATTORNEYS

April 14, 1970   H. D. JACKSON   3,505,746
EDUCATIONAL TESTING SYSTEM
Filed Nov. 13, 1967   4 Sheets-Sheet 2

INVENTOR.
HAL D. JACKSON
BY Head & Johnson
ATTORNEYS

April 14, 1970          H. D. JACKSON          3,505,746

EDUCATIONAL TESTING SYSTEM

Filed Nov. 13, 1967                              4 Sheets-Sheet 3

| Words | Definitions |
|---|---|
| 1. carboniferous | appraiser |
| 2. platypus | prone |
| 3. scion | pacify |
| 4. yegg | flower |
| 5. modulate | cougar |
| 6. indurate | descendant |
| 7. incumbent | producing coal |
| 8. geranium | gold |
| 9. obstreperous | pickel |
| 10. procumbent | criminal |
| 11. dogmatic | officeholder |
| 12. conifer | unruly |
| 13. aurum | distorted |
| 14. valuator | hardened |
| 15. veracious | tone down |
| 16. wry | duckbill |
| 17. gherkin | opinionated |
| 18. placate | truthful |
| 19. puma | evergreen |

Fig. 4.

INVENTOR.
HAL D. JACKSON

BY *Head & Johnson*

ATTORNEYS

April 14, 1970   H. D. JACKSON   3,505,746
EDUCATIONAL TESTING SYSTEM
Filed Nov. 13, 1967   4 Sheets-Sheet 4

INVENTOR.
HAL D. JACKSON
BY Head & Johnson
ATTORNEYS

United States Patent Office 3,505,746
Patented Apr. 14, 1970

3,505,746
EDUCATIONAL TESTING SYSTEM
Hal D. Jackson, 1112 E. 35th Place,
Tulsa, Okla. 74105
Filed Nov. 13, 1967, Ser. No. 682,320
Int. Cl. G09b 3/08
U.S. Cl. 35—9                                  6 Claims

ABSTRACT OF THE DISCLOSURE

A knowledge testing system which can be incorporated into books or the like includes reusable answer indicia covering tabs which, when pressed downward with a finger or object will reveal the correctness of a test answer.

BACKGROUND OF THE INVENTION

This invention relates and pertains to educational teaching aids and more particularly an educational self-testing apparatus wherein the test answer indicia is normally concealed as, for example, to a series of questions, true-false questions or multiple choice questions until the individual being tested actuates the concealment which visually indicates the correctness of an answer thereto. The individual knows immediately whether it is the right or wrong answer.

Educational testing and examination devices known heretofore this invention as for example that shown in U.S. Patents 3,283,416—Taylor et al.; 3,218,733—Roop et al.; 2,471,223—Lorber; and 2,095,111—Triolo have taught testing and educational devices which ordinarily involve expendable portions in that they are either punched, written upon or include removable elements which makes them no longer reusable.

SUMMARY

Accordingly, this invention provides an educational testing system which is not expendable and which is reusable and which in a preferred embodiment can be incorporated directly into and as a leaf or page of a book.

The preferred invention provides a spring-biased tab which is incorporated as a part of a sheet or leaf of a book. When open to a particular page containing these tabs they are resiliently biased normally outward from the normal plane of the book. Beneath the tab page and beneath each tab is an additional sheet containing visual answers or indications of a right or wrong answer. The normal view to the individual being self-tested is such that the answers indicia are not in sight. By placing a finger, pencil eraser or pencil opposite a desired answer choice will cause the tab to bend oppositely to its normal position and by virtue of the space beneath the raised portion of the next upper tab will reveal, by sight on the bottom sheet, whether the answer so chosen is correct.

In addition it is an object of this invention to provide an educational testing system and apparatus which may be incorporated into a regular book without adding substantial amount of thickness thereto.

A yet further object of this invention is to provide a resiliently outward biased tab means composed of material so arranged such that when the book is closed the tabs will maintain their normal bias outwardly.

BRIEF DESCRIPTION OF THE DRAWINGS

FIGURE 4 is a perspective view of an additional testing system utilizing the principles of this invention.

DESCRIPTION OF THE PREFERRED EMBODIMENTS

Figure 1:
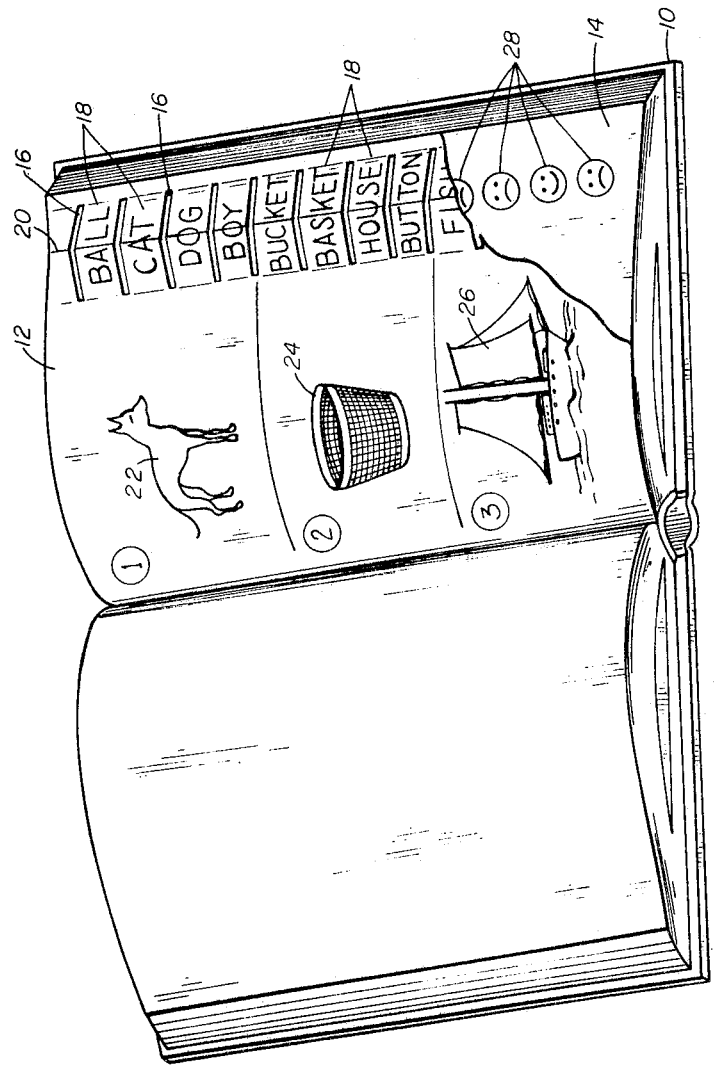
FIGURE 1 represents a perspective view partially cutaway of a book incorporating the testing concepts and apparatus of this invention.

As shown in FIGURE 1 a book 10 incorporates the self-testing system of this invention by placing at appropriate places therein a first test overleaf 12 beneath which is placed a second underleaf 14 containing the answers. The overleaf 12 is preferably of a sturdy material such as foldable synthetic plastic materials such as vinyl or polyolefin sheets, which may be transparent except for that portion covering the answer indicia. In an appropriate portion of first leaf 12 opposite the answers are a plurality of preformed slits 16 between which are formed answer tabs 18, which in this instance make up a multiple choice answer for a simple identification of an object and word, each word being imprinted upon each tab 18. Tabs 18 include a preformed fold 20 (shown by the dotted line) which, because of the nature of overleaf 12, or to that part containing the tabs 18, will, when the testing page is open, normally bias outwardly from the normal plane of the leaf or sheet 12. In some instances, for example, overleaf 12 may be a transparent overleaf depicting objects 22, 24 and 26 therethrough but containing opaque tabs 18 covering the answers or answer objects 28. As such, a plastic material, containing a fold 20 which cannot be pressed out upon closing of the book 10 is preferred. In other instances overleaf 12 may be, when not in use, folded along fold 20 such that when the book is closed the tab 18 will be caused to maintain its normally outwardly biased condition.

Figure 2:
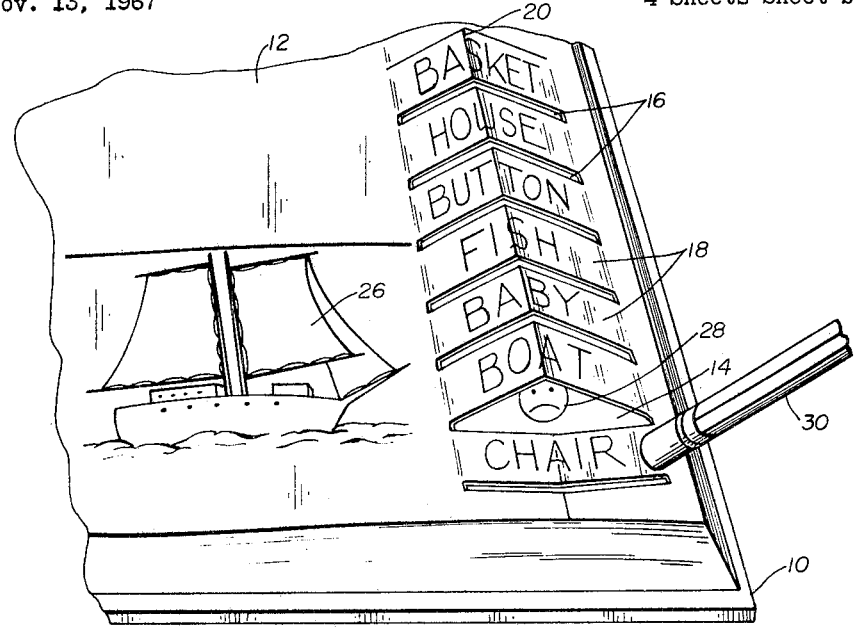
FIGURES 2 and 3 are enlarged perspective views of the system disclosed in FIGURE 1 and the manner in which it is utilized as a self-testing aid.
Figure 3:
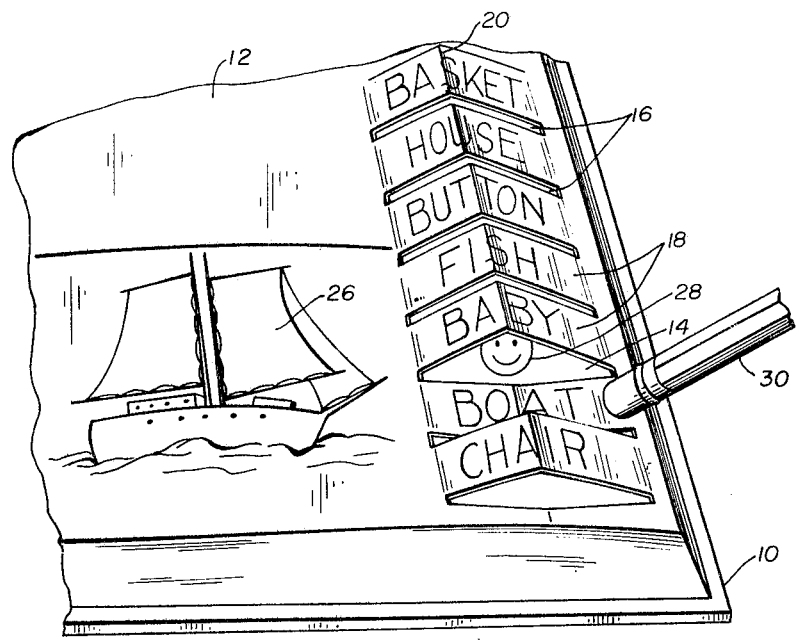

FIGURES 2 and 3 depict, with simple word-picture comparison problem the operation of this invention. In this instance caricature depictions 28 are utilized to indicate the rightness or wrongness of the answer to the individual under self-test. That is, if upon comparison of the object, a boat in this instant, the person placed a finger or object 30 upon tab 18 denoting "CHAIR" the caricature 28, depicting a sad face to denote a wrong answer, would show through the space remaining because of the preindented adjacent tab 18. That is, when a tab 18 is depressed by a finger or an object such as pencil or eraser 30 the answer is viewed from beneath the next upper tab which remains in its preindented position. As shown in FIGURE 3 when depressing the correct answer "BOAT" a caricature 28 of a smiling or happy face depicts a correct answer to the person under self-test.

Although the invention heretofore has been described with reference to a relatively simple self-test embodiment this, of course, is not to be considered as limiting as a variety of forms of indication means 28 may be utilized to indicate, visually and immediately, the correctness of an answer for a variety of intelligence levels. However, no matter what learning age is involved the apparatus of this invention provides and reveals only momentarily whether or not the person had chosen the correct answer to a question. Of course, by the process of elimination of wrong answers the correct answer can be eventually learned.

Incorporation within a book allows the testing procedure to be positioned as for example at the end of a particular chapter or learning subject. In this way the person under self-test can block out incorrect answers or choices yet allow the correct answer or choice to be stored in the human mind. Hence, in utilizing the invention disclosed herein the self-testing procedures provide immediate answers after study of the particular learning material. The concept of this invention may be applied to many forms of testing including true or false tests or multiple choice tests. For example, in FIGURE 4 the concepts of this invention are made applicable to a first sheet 32 beneath which a second sheet 34 provides a comparative analysis of the words column with the definitions inscribed upon preindented tabs 36 such that when the correct answer is depressed as is shown at tab 38 by pencil 40 the correct answer generally shown by the numeral 42 becomes visible beneath the next adjacent tab space.

Figure 5:
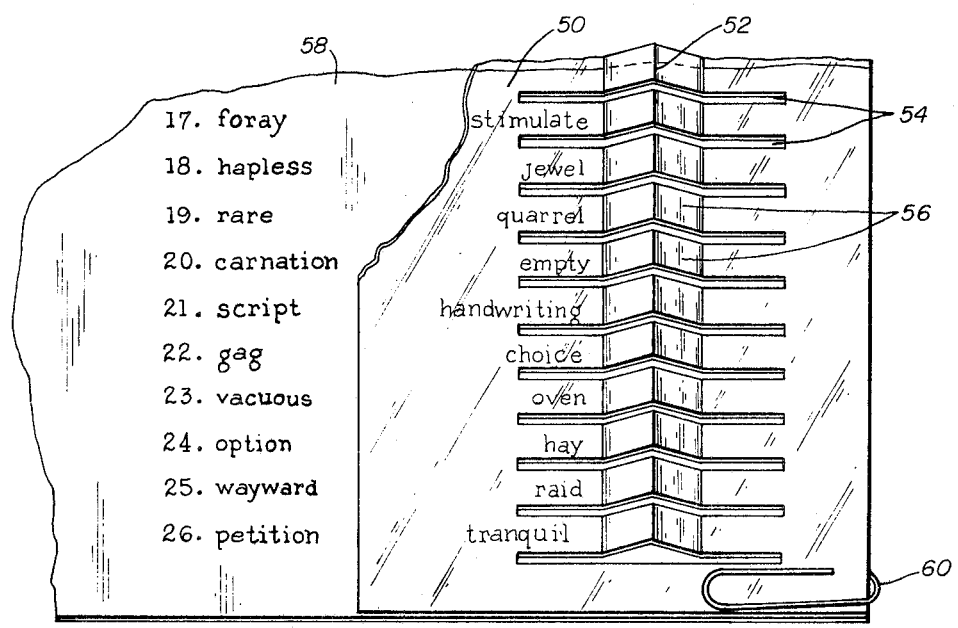
FIGURE 5 is a partial perspective view which represents an alternate embodiment of this invention.

FIGURE 5 is descriptive of an alternate embodiment of this invention utilizing a plastic cover or overleaf sheet, preferably transparent, 50, which is preindented along line 52 transverse to a plurality of slits 54 between which are formed answer indicator covering tabs 56. In utilizing this embodiment mimeographed second sheets 58 may be pre-prepared by a teacher with each student having his own separate plastic cover strip 50 which could be clipped at 60 to the mimeographed test sheet 58.

A further modification of this invention involves the utilization of a single and preferably plastic cover strip 50 which may be utilized in combination with pre-printed pages of a book with such cover strip folded and stored in an appropriate envelope within the book or in the alternative which may be formed as a part of the back of a book such that when folded outwardly it may be folded over given test pages.

Figure 6:
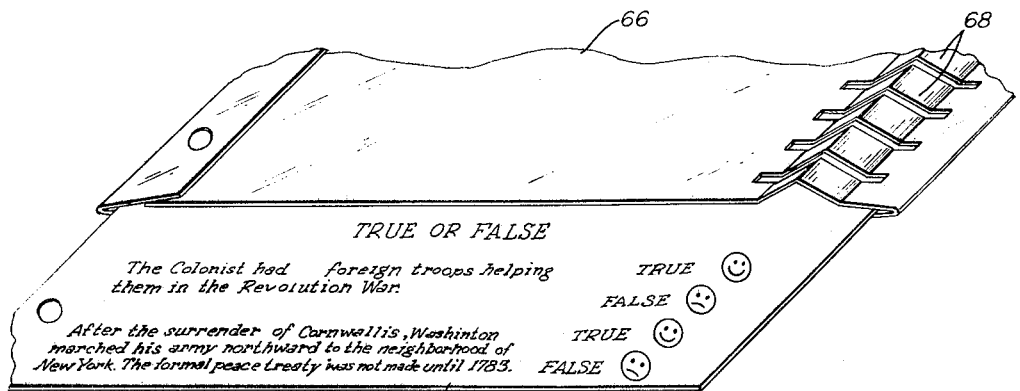
FIGURE 6 is a partial perspective view of another alternate embodiment of this invention.

In FIGURE 6 the overleaf 66 comprises a transparent folder or envelope having the opaque answer tabs 68, as heretofore described, which are spring biased outward along a longitudinal row. The envelope is adapted to receive and allow removal of underleaf 70. Such an underleaf permits use of a pre-printed page containing the questions, answers and answer indicia.

The invention has been described with reference to specific and preferred embodiments. It will be apparent, however, that other modifications can be made without departing from the spirit and scope of the invention. Accordingly, this invention should be construed not to be limited to the embodiment herein described but should be limited only by the scope of the appended claims.

What is claimed:

1. An educational self-testing apparatus comprising:
    an overleaf, said overleaf comprising a row of aligned tabs, each tab representing test answer information and each tab independently and normally spring biased outwardly
    an underleaf, beneath said overleaf and containing test question and/or answer indicia unexposed beneath said tabs such that when a desired answer tab is depressed against said bias, said indicia will be exposed to view from beneath the next upper adjacent tab, said indicia indicating the correctness of the test answer, and such that when said desired tab is not depressed it will return to said normal position.

2. Apparatus according to claim 1 wherein said overleaf and said underleaf are incorporated as bound pages of a book.

3. Apparatus according to claim 1 wherein said overleaf is a transparent synthetic resin material having opaque tabs.

4. Apparatus according to claim 2 wherein said overleaf is a transparent synthetic resin material having opaque tabs.

5. Apparatus according to claim 1 wherein the said spring bias of said tabs is caused by a transverse fold or pleat tending to normally arch said tabs up at substantially the same height.

6. Apparatus according to claim 3 wherein said overleaf is an envelope structure with an opening to receive and remove said underleaf.

References Cited

UNITED STATES PATENTS 3,218,733   11/1965   Roop et al. _____ 35—9

EUGENE R. CAPOZIO, Primary Examiner

W. H. GRIEB, Assistant Examiner